United States Patent
Zhang et al.

(10) Patent No.: US 10,904,888 B2
(45) Date of Patent: Jan. 26, 2021

(54) CONTENTION-BASED UPLINK DATA TRANSMISSION

(71) Applicant: Nokia Technologies Oy, Espoo (FI)

(72) Inventors: Yuantao Zhang, Beijing (CN); Zhuyan Zhao, Beijing (CN); Jingyuan Sun, Beijing (CN); Hongchao Li, Beijing (CN); Yanji Zhang, Beijing (CN)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/307,732

(22) PCT Filed: Jun. 8, 2016

(86) PCT No.: PCT/CN2016/085274
§ 371 (c)(1),
(2) Date: Dec. 6, 2018

(87) PCT Pub. No.: WO2017/210893
PCT Pub. Date: Dec. 14, 2017

(65) Prior Publication Data
US 2019/0215822 A1  Jul. 11, 2019

(51) Int. Cl.
*H04W 72/04* (2009.01)
*H04W 74/00* (2009.01)
(Continued)

(52) U.S. Cl.
CPC ......... *H04W 72/048* (2013.01); *H04L 1/1887* (2013.01); *H04L 5/0037* (2013.01);
(Continued)

(58) Field of Classification Search
CPC .............. H04W 72/048; H04W 72/005; H04L 5/0053; H04L 5/0037; H04L 1/1887
See application file for complete search history.

(56) References Cited

U.S. PATENT DOCUMENTS

2010/0118800 A1* 5/2010 Kim ..................... H04L 1/0071
                                                              370/329
2012/0039295 A1* 2/2012 Quan .................. H04W 74/085
                                                              370/329
(Continued)

FOREIGN PATENT DOCUMENTS

CN         1878145 A      12/2006
CN       104039013 A       9/2014
(Continued)

*Primary Examiner* — Mohammad S Anwar
(74) *Attorney, Agent, or Firm* — Harrington & Smith (57) ABSTRACT

A method and apparatus to configure a resource pool for a plurality of user equipment configured with contention based transmission; configure a resource allocation within the resource pool for a contention based transmission by a user equipment of the plurality of user equipment configured for contention based transmissions, wherein the resource allocation is configured with more than one predefined or preconfigured sets of resource allocation granularities; and send information including the resource allocation towards the user equipment, wherein the information includes an indication of a set of the predefined or preconfigured sets of the resource allocation granularities that the user equipment is to use for the contention based transmission.

22 Claims, 4 Drawing Sheets

---

410: configuring a resource pool for a plurality of user equipment configured with contention based transmission 420: configuring a resource allocation within the resource pool for a contention based transmission by user equipment of the plurality of user equipment configured for contention based transmissions, wherein the resource allocation is configured with more than one predefined or preconfigured sets of resource allocation granularities 430: sending information comprising the resource allocation towards the user equipment, wherein the information comprises an indication of a set of the predefined or preconfigured sets of the resource allocation granularities that the user equipment is to use for the contention based transmission (51) Int. Cl.
*H04L 5/00* (2006.01)
*H04L 1/18* (2006.01)
*H04W 72/00* (2009.01)
*H04W 72/12* (2009.01)

(52) U.S. Cl.
CPC .......... *H04L 5/0053* (2013.01); *H04L 5/0094* (2013.01); *H04W 72/005* (2013.01); *H04W 72/042* (2013.01); *H04W 74/006* (2013.01); *H04L 1/1822* (2013.01); *H04W 72/121* (2013.01)

(56) References Cited

U.S. PATENT DOCUMENTS

| | | | |
|---|---|---|---|
| 2012/0213196 A1 | 8/2012 | Chung et al. | 370/330 |
| 2012/0263095 A1* | 10/2012 | Quan | H04W 52/0216 370/312 |
| 2013/0003678 A1* | 1/2013 | Quan | H04W 72/04 370/329 |
| 2014/0023006 A1 | 1/2014 | Jeong et al. | 370/329 |
| 2014/0269338 A1* | 9/2014 | Jung | H04L 5/0055 370/241 |

FOREIGN PATENT DOCUMENTS

| | | |
|---|---|---|
| CN | 105264999 A | 1/2016 |
| WO | WO-2015/122701 A1 | 8/2015 |

\* cited by examiner

410: configuring a resource pool for a plurality of user equipment configured with contention based transmission 420: configuring a resource allocation within the resource pool for a contention based transmission by user equipment of the plurality of user equipment configured for contention based transmissions, wherein the resource allocation is configured with more than one predefined or preconfigured sets of resource allocation granularities 430: sending information comprising the resource allocation towards the user equipment, wherein the information comprises an indication of a set of the predefined or preconfigured sets of the resource allocation granularities that the user equipment is to use for the contention based transmission FIGURE 4a 450: receiving from a network device information of resources allocated for a contention based transmission by the apparatus, wherein the resource allocation is configured with more than one predefined or preconfigured sets of resource allocation granularities, and wherein the information comprises an indication of a set of the predefined or preconfigured sets of the resource allocation granularities that the apparatus is to use for the contention based transmission 460: based on the information, identifying the set of the predefined or preconfigured sets of the resource allocation granularities that the apparatus is to use for the contention based transmission 470: performing the contention based transmission using the identified set of the resource allocation granularities FIGURE 4b

CONTENTION-BASED UPLINK DATA TRANSMISSION

This patent application is a U.S. National Stage application of International Patent Application Number PCT/CN2016/085274 filed Jun. 8, 2016, which is hereby incorporated by reference in its entirety.

TECHNICAL FIELD

The teachings in accordance with the example embodiments of this invention relate generally to flexible resource selection and allocation for contention-based (CB) data transmission and, more specifically, relates to flexible resource allocation and selection for CB transmission to improve uplink (UL) throughput.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Certain abbreviations that may be found in the description and/or in the Figures are herewith defined as follows:
3GPP: $3^{rd}$ generation project partner
5G: $5^{th}$ Generation
BSR: Buffer status report
CB Contention based
CBP Contention based protocol
C-RNTI: Cell-Radio network temporary identifier
DCI: Downlink control information
DL: Downlink
eNB: Enhanced node-B, base station
HARQ: Hybrid automatic repeat request
LTE: Long term evolution
MTC Machine-type communication
PRACH: Physical random access channel
PRB: Physical resource block
PUSCH: Physical uplink shared channel
RU Resource unit
SR: Scheduling request
TB Transport Block
TBS: Transport block size
UE: User equipment
UL: Uplink A contention-based transmission uses a contention based protocol (CBP) is a communications protocol for operating wireless telecommunication equipment that allows many users to use the same radio channel without pre-coordination. 3GPP LTE uses a contention free uplink data transmission. When a UE has data available in the logic buffer that is ready for UL transmission, it needs to request uplink resources for data transmission by typically sending a scheduling request (SR) to an eNB. Then after the eNB successfully detects the SR, the eNB would send a UL grant to the UE to allocate certain PUSCH resources for UE to send buffer status report (BSR). The UE would then send the BSR (i.e., the amount of data available in its logical buffer) after detecting this UL grant. Then the eNB allocates corresponding UL resources by means of another UL grant to the UE for data transmission, taking the uplink radio condition between UE and eNB into account.

It can be observed that this kind of process not only results in high latency for eNB-UE handshaking etc. (as a calculation, typically 17.5 ms is needed before any data transmission), but also requires much DL/UL control channel overhead. This is not efficient especially for many UL small packet transmissions, which is the typical case in low rate MTC communication, smartphone applications, real-time remote control, VoIP, gaming, feedback information of a communication protocol e.g., TCP ACK, etc.

The example embodiments of the invention work to improve the latency performance and reduce the overhead of contention based operations at least as described above.

SUMMARY

In an example aspect of the invention, there is an apparatus, such as a network side apparatus, comprising: at least one processor; and at least one memory including computer program code, where the at least one memory and the computer program code are configured, with the at least one processor, to cause the apparatus to at least: configure a resource pool for a plurality of user equipment configured with contention based transmission; configure a resource allocation within the resource pool for a contention based transmission by a user equipment of the plurality of user equipment configured for contention based transmissions, wherein the resource allocation is configured with more than one predefined or preconfigured sets of resource allocation granularities; and send information comprising the resource allocation towards the user equipment, wherein the information comprises an indication of a set of the predefined or preconfigured sets of the resource allocation granularities that the user equipment is to use for the contention based transmission.

In another example aspect of the invention, there is a method comprising: configuring a resource pool for a plurality of user equipment configured with contention based transmission; configuring a resource allocation within the resource pool for a contention based transmission by user equipment of the plurality of user equipment configured for contention based transmissions, wherein the resource allocation is configured with more than one predefined or preconfigured sets of resource allocation granularities; and sending information comprising the resource allocation towards the user equipment, wherein the information comprises an indication of a set of the predefined or preconfigured sets of the resource allocation granularities that the user equipment is to use for the contention based transmission.

A further example embodiment is a method comprising the method of the previous paragraph, wherein the indication of the set of the predefined or preconfigured sets of the resource allocation that the user equipment is to use comprises at least one of a set index and a maximum granularity of the set the user equipment is to use for the contention based transmission, wherein the configured resource pool comprises at least one physical resource unit, and interleaving and re-numbering the physical resource units to generate sequential virtual physical resource units, wherein each of the predefined or preconfigured sets of resource allocation granularities comprises a different number of physical resource units, wherein each of the physical resource units contain at least one physical resource block, wherein a starting physical resource unit of at least one starting physical resource unit of the configured resource pool that the user equipment is to use for contention based transmission is based on at least one of a hybrid automatic repeat request process ID and a cell-radio network temporary identifier associated with the user equipment. In a further embodiment the starting physical resource unit is same for the indicated set of resource allocation granularities. In another embodiment the information comprises a hybrid automatic repeat request process configuration for at least one user equipment of the plurality of user equipment, and wherein a resource unit offset is configured between the hybrid automatic repeat processes. In accordance with the example embodiments the set of the predefined or preconfigured sets of the resource allocation granularities that the user equipment is to use for the contention based transmission are different for different hybrid automatic repeat processes. Further, in accordance with the embodiments an amount of the more than one predefined or preconfigured sets of resource allocation granularities is based on an amount of the plurality of user equipment configured for contention based transmissions. In accordance with further example embodiments the information comprising the resource allocation and the indication of the set of the sets of resource allocation granularities is sent through broadcasting signaling, and wherein the information comprises the resource allocation and the indication of the set of the predefined or preconfigured sets of the resource allocation granularities is sent via one of user equipment specific or group user equipment specific higher layer signaling, or user equipment specific or group user equipment specific physical layer signaling.

A non-transitory computer-readable medium storing program code, the program code executed by at least one processor to perform at least the method as described in the paragraphs above.

In another example aspect of the invention, there is an apparatus comprising: means for configuring a resource pool for a plurality of user equipment configured with contention based transmission; means for configuring a resource allocation within the resource pool for a contention based transmission by user equipment of the plurality of user equipment configured for contention based transmissions, wherein the resource allocation is configured with more than one predefined or preconfigured sets of resource allocation granularities; and means for sending information comprising the resource allocation towards the user equipment, wherein the information comprises an indication of a set of the predefined or preconfigured sets of the resource allocation granularities that the user equipment is to use for the contention based transmission.

In accordance with the example embodiments as described in the paragraph above, at least the means for configuring and sending comprises a network interface, and computer program code stored on a computer-readable medium and executed by at least one processor.

A further example embodiment is an apparatus comprising the apparatus of the previous paragraphs, the indication of the set of the predefined or preconfigured sets of the resource allocation that the user equipment is to use comprises at least one of a set index and a maximum granularity of the set the user equipment is to use for the contention based transmission. In accordance with the example embodiments the configured resource pool comprises at least one physical resource unit, and interleaving and re-numbering the physical resource units to generate sequential virtual physical resource units. In accordance with an example embodiment each of the predefined or preconfigured sets of resource allocation granularities comprises a different number of physical resource units, wherein each of the physical resource units contain at least one physical resource block. In accordance with example embodiments an apparatus provides indication of a starting physical resource unit of at least one starting physical resource unit of the configured resource pool that the user equipment is to use for contention based transmission is based on at least one of a hybrid automatic repeat request process ID and a cell-radio network temporary identifier associated with the user equipment. In accordance with example embodiments the starting physical resource unit is same for the indicated set of resource allocation granularities, an amount of the more than one predefined or preconfigured sets of resource allocation granularities is based on an amount of the plurality of user equipment configured for contention based transmissions, the information comprises a hybrid automatic repeat request process configuration for at least one user equipment of the plurality of user equipment, and wherein a resource unit offset is configured between the hybrid automatic repeat processes, and/or the set of the predefined or preconfigured sets of the resource allocation granularities that the user equipment is to use for the contention based transmission are different for different hybrid automatic repeat processes.

In another example aspect of the invention, there is an apparatus, such as a user equipment side apparatus, comprising: at least one processor; and at least one memory including computer program code, where the at least one memory and the computer program code are configured, with the at least one processor, to cause the apparatus to at least: receive from a network device information of resources allocated for a contention based transmission by the apparatus, wherein the resource allocation is configured with more than one predefined or preconfigured sets of resource allocation granularities, and wherein the information comprises an indication of a set of the predefined or preconfigured sets of the resource allocation granularities that the apparatus is to use for the contention based transmission; based on the information, identify the set of the predefined or preconfigured sets of the resource allocation granularities that the apparatus is to use for the contention based transmission; and perform the contention based transmission using the identified set of the resource allocation granularities.

In still another example aspect of the invention, there is a method comprising: receiving from a network device information of resources allocated for a contention based transmission by the apparatus, wherein the resource allocation is configured with more than one predefined or preconfigured sets of resource allocation granularities, and wherein the information comprises an indication of a set of the predefined or preconfigured sets of the resource allocation granularities that the apparatus is to use for the contention based transmission; based on the information, identifying the set of the predefined or preconfigured sets of the resource allocation granularities that the apparatus is to use for the contention based transmission; and performing the contention based transmission using the identified set of the resource allocation granularities.

A further example embodiment is a method comprising the method of the previous paragraph, wherein the indication of the set of the predefined or preconfigured sets of the resource allocation that the user equipment is to use comprises at least one of a set index and a maximum granularity of the set the user equipment is to use for the contention based transmission, wherein the configured resource pool comprises at least one physical resource unit, and interleaving and re-numbering the physical resource units to generate sequential virtual physical resource units, wherein each of the predefined or preconfigured sets of resource allocation granularities comprises a different number of physical resource units, and wherein each of the physical resource units contain at least one physical resource block. In accordance with the example embodiments a starting physical resource unit of at least one starting physical resource unit of the configured resource pool that the user equipment is to use for contention based transmission is based on at least one of a hybrid automatic repeat request process ID and a cell-radio network temporary identifier associated with the user equipment, wherein the starting physical resource unit is same for the indicated set of resource allocation granularities, wherein the information comprises a hybrid automatic repeat request process configuration for at least one user equipment of the plurality of user equipment, and wherein a resource unit offset is configured between the hybrid automatic repeat processes, and wherein the set of the predefined or preconfigured sets of the resource allocation granularities that the user equipment is to use for the contention based transmission are different for different hybrid automatic repeat processes. In accordance with an example embodiment, an amount of the more than one predefined or preconfigured sets of resource allocation granularities is based on an amount of the plurality of user equipment configured for contention based transmissions. In another embodiment the information comprising the resource allocation and the indication of the set of the sets of resource allocation granularities is sent through broadcasting signaling. In accordance with the example embodiments the information comprising the resource allocation and the indication of the set of the predefined or preconfigured sets of the resource allocation granularities is sent via one of user equipment specific or group user equipment specific higher layer signaling, or user equipment specific or group user equipment specific physical layer signaling.

A non-transitory computer-readable medium storing program code, the program code executed by at least one processor to perform at least the method as described in the paragraphs above.

In yet another example aspect of the invention, there is an apparatus comprising: means for receiving from a network device information of resources allocated for a contention based transmission by the apparatus, wherein the resource allocation is configured with more than one predefined or preconfigured sets of resource allocation granularities, and wherein the information comprises an indication of a set of the predefined or preconfigured sets of the resource allocation granularities that the apparatus is to use for the contention based transmission; means, based on the information, for identifying the set of the predefined or preconfigured sets of the resource allocation granularities that the apparatus is to use for the contention based transmission; and means for performing the contention based transmission using the identified set of the resource allocation granularities.

In accordance with the example embodiments as described in the paragraph above, at least the means for receiving, identifying, and performing comprises a network interface, and computer program code stored on a computer-readable medium and executed by at least one processor.

A further example embodiment is an apparatus comprising the apparatus of the previous paragraphs, wherein the indication of the set of the predefined or preconfigured sets of the resource allocation granularities that the apparatus is to use comprises at least one of a set index and a maximum granularity of the set to use for the contention based transmission, wherein the configured resource pool comprises at least one physical resource unit, and interleaving and re-numbering the physical resource units to generate sequential virtual physical resource units, wherein each of the predefined or preconfigured sets of resource allocation granularities comprises a different number of physical resource units. In accordance with the example embodiments, the apparatus can determine a reference starting resource unit according to a higher layer configuration and determine a starting resource unit for each hybrid automatic repeat request process according to a configured offset of resource units between hybrid automatic repeat request processes. In accordance with the example embodiments, a starting physical resource unit of at least one starting physical resource unit of the configured resource pool that the apparatus is to use for contention based transmission is based on at least one of a hybrid automatic repeat request process ID and a cell-radio network temporary identifier associated with the user equipment, wherein the starting physical resource unit is same for the indicated set of resource allocation granularities. In accordance with the example embodiments, the configuration of the more than one sets of resource allocation granularities is received through broadcasting signaling, or apparatus specific or group apparatus specific higher layer signaling, or apparatus specific or group apparatus specific physical layer signaling.

A communication system comprising the network side apparatus and the user equipment side apparatus performing operations as described above.

BRIEF DESCRIPTION OF THE DRAWINGS

The foregoing and other aspects of embodiments of this invention are made more evident in the following Detailed Description, when read in conjunction with the attached Drawing Figures, wherein.

DETAILED DESCRIPTION

In this invention, we propose flexible resource allocation and selection for contention based (CB) transmission to improve uplink (UL) throughput, and to enable Hybrid automatic repeat request (HARQ) process identification (ID) indication for CB transmission to reduce the collision probability.

Figure 1:
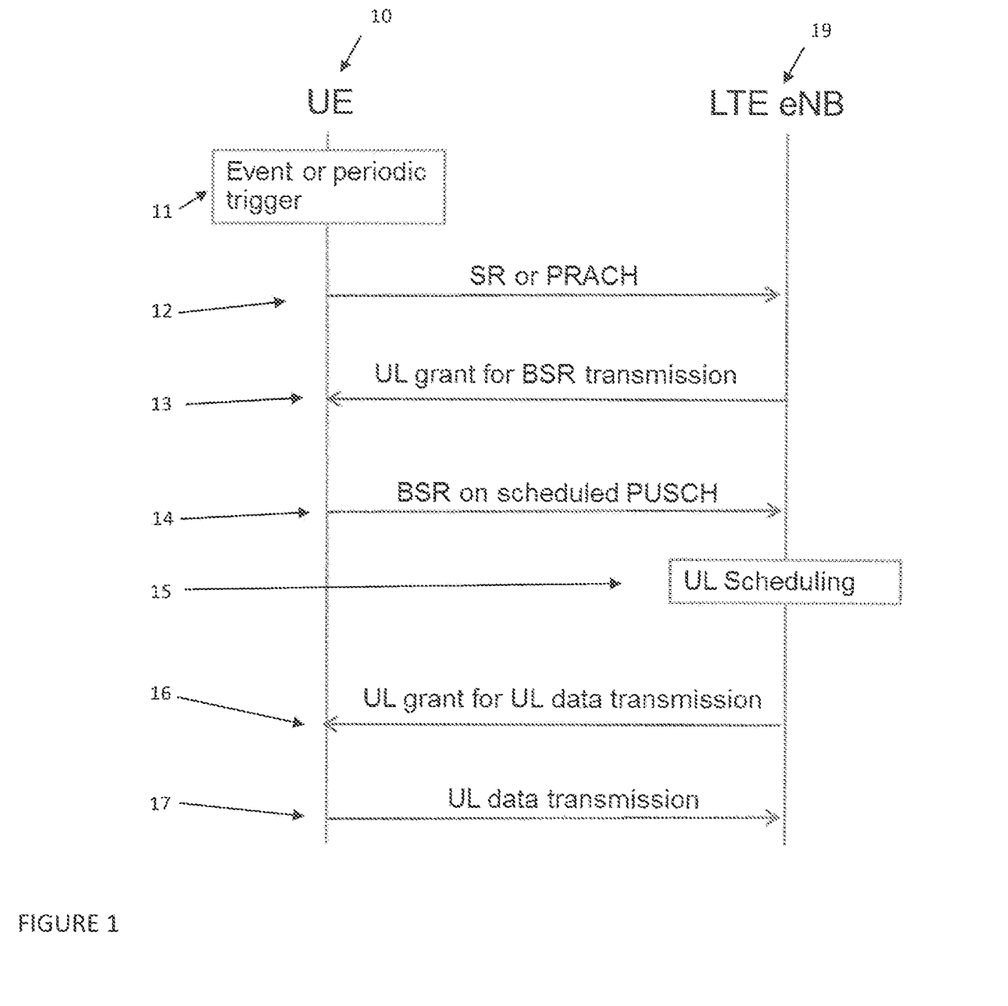
FIG. 1 shows an LTE UL contention free data transmission process.

FIG. 1 illustrates a typical 3GPP LTE contention free data transmission process as described above. As shown in FIG. 1, the UE 10, due to an event or periodic trigger 11, sends a scheduling request (SR) 12 to the LTE eNB 19. Then the eNB 19 returns an uplink (UL) grant for buffer status report (BSR) transmission 13. The UE 10 performs at step 14 a BSR on a physical uplink shared channel (PUSCH). At step 15 the eNB 19 performs the uplink (UL) scheduling for the UE 10. The UL grant is sent to the UE 10 at step 16. Then the UE 10 performs the UL data transmission at step 17. It can be observed that this kind of process not only includes high latency, but also much DL/UL control channel overhead.

In contention based uplink transmission, multiple UEs would be allocated with the same certain amount of time frequency resources, herein called a resource pool. A resource pool further contains multiple resource units, each of which can contain at least one physical resource block. With such kind of allocation, UE needs to know the resource units within the allocated resource pool for UL data transmission. It is desirable to have different UEs have different starting resource unit in the resource pool as much as possible so that the collision probability can be reduced. Besides, it would also be desirable to enable an eNB to adaptively allocate an appropriate transmission granularity e.g., in terms of certain number of resource units, to a UE taking the number of contention based UEs into consideration. Typically, the lower the number of contention based UEs, the larger the granularity the eNB can allocate. From UE point of view, it is desirable to have multiple resource allocation granularities so that UE can select one according to the packet size or TB size (TBS).

UE can determine a TBS for each resource allocation granularity according to the amount of resources (e.g., in terms of number of physical resource blocks) and the configured modulation and coding scheme (MCS). Then according to the incoming packet size, UE can select the most appropriate granularity for transmission. For example, if the incoming packet is smaller than the highest granularity, UE will select one granularity based on the equation below, $$I = \arg\min_{1 \leq n \leq N}(TBS^n - L_p)$$

Where
  $L_p$ is the incoming packet size;
  $TBS^n$ is the TBS for the $n^{th}$ granularity
While if the incoming packet size is larger than the highest granularity, the incoming packet can be segmented into multiple transmission blocks and UE can select the granularity for each transmission block according to the equal below, $$I = \arg\min_{1 \leq n \leq N}(TBS^n - L_{TBS})$$

where
  $L_{TBS}$ is the segmented transport block size;
  $TBS^n$ is the TBS for the $n^{th}$ granularity
Compared with only single resource allocation granularity configured to UE, such kind of resource allocation adaptation can achieve certain degrees of adaptation and improves the UL throughput and can be considered as determination of the most suitable UL resource units.

The example embodiments of the invention work to address at least these issues associated with contention based operations.

For contention based UL data transmission, the eNB allocates the UL resources for data transmission to a UE without knowing the amount of data and the actual time when data transmission happens. Since there are less UL resources than number of UE, the same UL resources are shared by/allocated to several UE which may start to use the same UL resources at the same time independent from each other. UL resources are based on "timeslots" and/or frequencies. Collision probability should be reduced/minimized to improve UL throughput.

Furthermore, if one data packet that is transmitted by multiple TBs and multiple associated HARQ processes, it is desirable to enable the eNB to know the ID for each HARQ process so that eNB can perform soft information combining at the eNB to improve the UL throughput.

Figure 2:
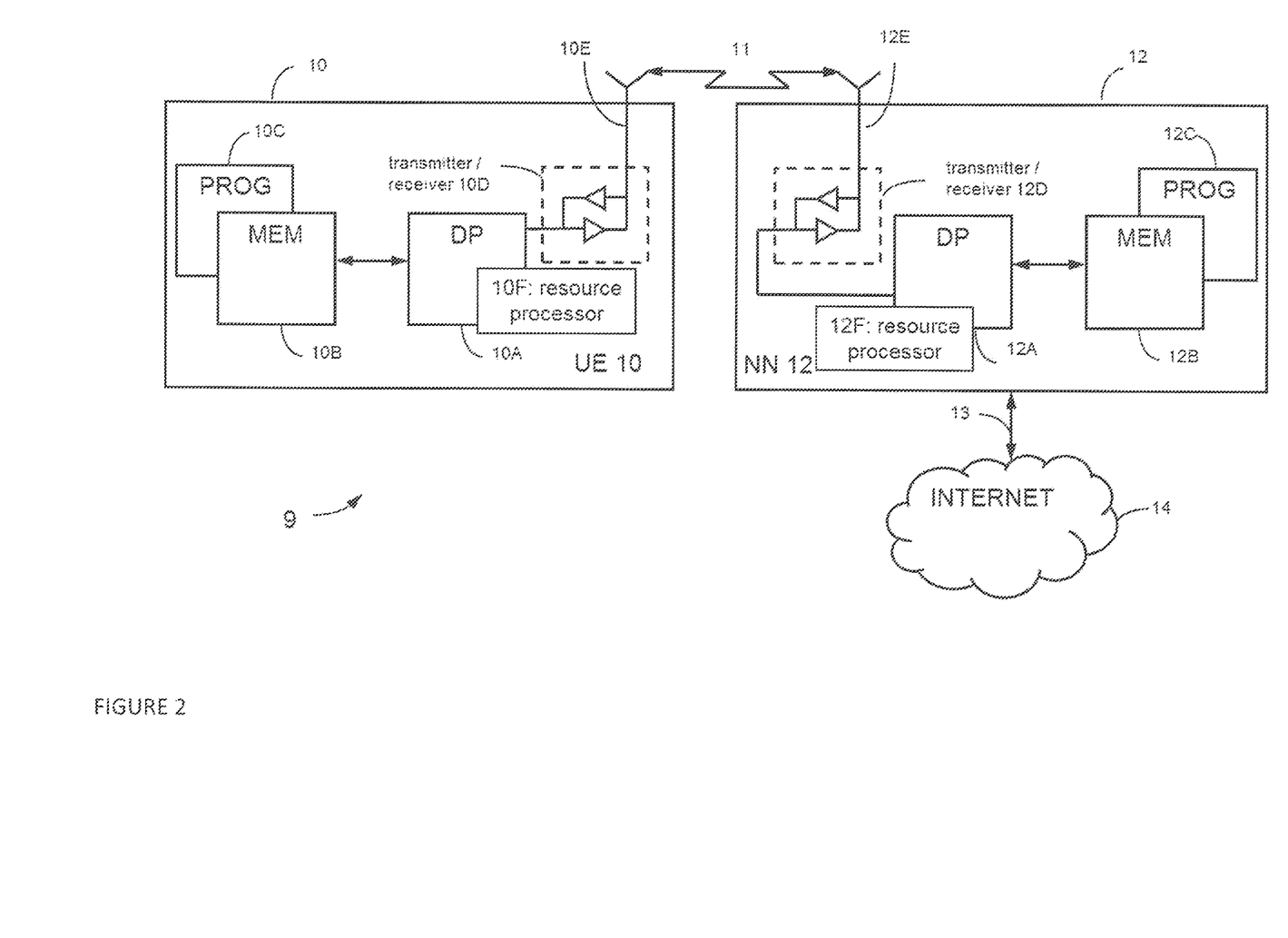
FIG. 2 shows a high level block diagram of various devices used in carrying out various aspects of the invention.

Before describing the example embodiments of the invention in details, reference is made to FIG. 2 for illustrating a simplified block diagram of various electronic devices that are suitable for use in practicing the example embodiments of this invention. In FIG. 2 a wireless access network 9 is adapted for communication between a user equipment UE 10 and a network node NN 12 or other access node of an access network. In accordance with the example embodiments the NN 12 can be any network device e.g., a base station that is part of or separate from the network 9. The network 9 may include or may use a higher controlling node (not shown, by non-limiting example a gateway GW, a user plane entity UPE, a mobility management entity MME, or a system architecture evolution gateway SAE-GW) for operations in accordance with the example embodiments. Such a higher controlling node may be accessible via any communication link, including the antenna 10E and/or 12E, and/or via Internet 14.

The UE 10 includes a data processor (DP) 10A, a memory (MEM) 10B that stores a program (PROG) 10C, and a suitable radio frequency (RF) transmitter and receiver 10D coupled to one or more antennas 10E for bidirectional wireless communications over a data link 11 with the NN 12. The NN 12 also includes a DP 12A, a MEM 12B that stores a PROG 12C, and a suitable RF transmitter and receiver 12D coupled to one or more antennas 12E. The NN 12 may be coupled via a data link 13 to the internet or other broader communication network. Also at the UE 10 and the NN 12 there are resource processors 10F, 12F, respectively, for defining and configuring resource sets in accordance with the example embodiments of the invention as described herein. At least one of the PROGs 10C and 12C is assumed to include program instructions that, when executed by the associated DP, enable the electronic device to operate in accordance with the example embodiments of this invention as described in detail below.

In accordance with an example embodiment of the invention there is an apparatus (such as the NN 12 of FIG. 2) comprising: means for configuring (DP 12A, DP 12F, PROG 12C, and/or MEM 12B of FIG. 2) a resource pool for a plurality of user equipment configured with contention based transmission; means for configuring (DP 12A, DP 12F, PROG 12C, and MEM 12B of FIG. 2) a resource allocation within the resource pool for a contention based transmission by user equipment of the plurality of user equipment configured for contention based transmissions, wherein the resource allocation is configured with more than one predefined or preconfigured sets of resource allocation granularities; and means for sending (Antenna 12E, transmitter/receiver 12D of FIG. 2) information comprising the resource allocation towards the user equipment, wherein the information comprises an indication of a set of the predefined or preconfigured sets of the resource allocation granularities that the user equipment is to use for the contention based transmission.

In accordance with an example embodiment of the invention there is an apparatus (such as the UE 10 of FIG. 2) comprising: means for receiving (Antenna 10E, transmitter/receiver 10D of FIG. 2) from a network device information of resources allocated for a contention based transmission by the apparatus, wherein the resource allocation is configured with more than one predefined or preconfigured sets of resource allocation granularities, and wherein the information comprises an indication of a set of the predefined or preconfigured sets of the resource allocation granularities that the apparatus is to use for the contention based transmission; means, based on the information, for identifying (DP 10A, DP 10F, PROG 10C, and/or MEM 10B of FIG. 2) the set of the predefined or preconfigured sets of the resource allocation granularities that the apparatus is to use for the contention based transmission; and means for performing (Antenna 10E, transmitter/receiver 10D, DP 10A, DP 10F, PROG 10C, and MEM 10B of FIG. 2) the contention based transmission using the identified set of the resource allocation granularities.

In general, the example embodiments of this invention may be implemented by computer software executable by the DP 10A of the UE 10 and by the DP12A of the NN 12, or other DPs, or by hardware, or by a combination of software and/or firmware and hardware. The interactions between the major logical elements should be obvious to those skilled in the art for the level of detail needed to gain an understanding of the broader aspects of the invention beyond only the specific examples herein. It should be noted that the invention may be implemented with an application specific integrated circuit ASIC, a field programmable gated array FPGA, a digital signal processor or other suitable processor to carry out the intended function of the invention, including a central processor, a random access memory RAM, read only memory ROM, and communication ports for communicating between the NN 12 and the UE 10 as detailed above.

Further, it is noted that the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The MEMs 10B and 12B may be of any type suitable to the local technical environment and may be implemented using any suitable data storage technology, such as semiconductor based memory devices, magnetic memory devices and systems, optical memory devices and systems, fixed memory and removable memory. The DPs 10A and 12A may be of any type suitable to the local technical environment, and may include one or more of general purpose computers, special purpose computers, microprocessors, digital signal processors (DSPs) and processors based on a multi-core processor architecture, as non-limiting examples.

At least one of the memories is assumed to tangibly embody software program instructions that, when executed by the associated processor, enable the electronic device to operate in accordance with the example embodiments of this invention, as detailed by example above. As such, the example embodiments of this invention may be implemented at least in part by computer software executable by the controller/DP of the UE 10 or the NN 12 by hardware, or by a combination of software and hardware.

Based on the foregoing it should be apparent that the example embodiments of this invention provide a method for performing the example embodiments of the invention.

In accordance with an example embodiment of the invention there is enabling flexible resource allocations by defining multiple sets of CB-PUSCH transmission granularities for the resource allocations. These types of operations can be performed by both or either of the UE 10 and the NN 12 as in FIG. 2. Further, it is noted that any reference to operations performed by an eNB or a UE are none limiting to the example embodiments, and these operations can be performed by any similarly equipped device, whether mobile or stationary.

The operations in accordance with the example embodiments include:

The eNB pre-defines UL resource sets with different granularities (different number of physical resource units (RU) in each resource set, each RU contains at least one physical resource block) and indicate the resource sets via SIB into a cell, or via physical layer signalling, or via UE specific higher layer signalling towards the UE. Granularity of UL resource set (multiple CB-PUSCH transmission granularities) may depend on a number of contention based UEs for the resource set. For example, a lower number of UEs for an UL resource allows for a higher granularity of resources. Further, the granularity of the resource set can be based on a targeted collision probability, and/or targeted latency probability for UL data transmission; and When UE has UL data to send, the UE determines the most suitable UL resource units from the received UL resource pool indications and starts UL data transmission using these resource units. Determination may be based on amount of UL data, on selection of starting resource unit based on at least HARQ process ID, and/or on a UE identifier.

It is noted that the Hybrid automatic repeat request (hybrid ARQ or HARQ) is a combination of high-rate forward error-correcting coding and ARQ error-control. In standard ARQ, redundant bits are added to data to be transmitted using an error-detecting (ED) code such as a cyclic redundancy check (CRC). Receivers detecting a corrupted message will request a new message from the sender. As similarly stated above, for one packet that is transmitted by multiple TBs and multiple HARQ processes, it is desirable to have eNB know the HARQ process ID in order to do soft information combining. The HARQ process ID can be of course explicitly indicated but this requires more UL overhead and even new UL channel to carry such indication. Further, as similarly stated above, it is desirable to have different UEs have different starting position as much as possible so that the collision probability can be reduced.

In accordance with the example embodiments of the invention a CB-PUSCH starting RU for a HARQ process can be determined from CB-PUSCH transmission granularities information, e.g., dependent on maximum granularity.

In accordance with the example embodiments there are multiple sets of CB-PUSCH transmission granularities defined for resource allocations. Each of the granularities contain at least one predefined number of RU so a network node, such as an eNB, would configure one set of granularities to CB UEs that are allocated with same set of resources. The configuration of the granularities can be based on e.g., the number of CB UEs on the indicated resources. Typically, if there are limited number of CB UEs allocated with certain resources, the configured granularities can be much higher. In that sense, the configured granularities could be common for all CB UEs, and the configuration can be transmitted through broadcast signaling.

As one non-limiting example, there could be three predefined sets of granularities such as shown below, Set 1: {1,2,4} RUs
Set 2: {1,2,4,8} RUs
Set 3: {1,2,4,8,16} RUs As a further example, CB UEs can be indicated with set 3, if there are plenty available resources for CB (e.g., >=50 RUs) and limited number of CB UEs (e.g., <3). UE can choose either 1, 2, 4, 8 or 16 RUs for CB-PUSCH transmission according to the TBS, preferably according to the most suitable RU determination.

In accordance with the example embodiments the network node or eNB can indicate a set by indicating a set index, or indicate the maximum granularity. Further, the UE can determine other granularities implicitly. For example, in situations when predefined sets of granularities are defined e.g., as discussed above, and if the UE is indicated a granularity with 16, then UE can know that the set of granularities is {1,2,4,8,16} i.e., the set includes additionally smaller granularities, e.g., determined by dividing by 2 or another number.

In another example embodiment, the network node or eNB might configure different set of granularities for the initial transmission and for the retransmission.

Further, in accordance with another example embodiment on the network side, a network node or eNB can detect each possible transmission granularity through blind detection. One kind of blind detection could be for example an eNB tries one decoding for each granularity. The other example is that the eNB detects the accumulated power for each granularity.

In accordance with the example embodiments of the invention, the UE can determine a starting RU for CB-PUSCH transmission based on at least HARQ process ID and/or an UE identifier. After receiving the information identifying the available resources and the set of transmission granularities, the UE can determine the starting RU and the resources to transmit a certain TB. Other parameters for starting RU decision processes could be based on a maximum configured granularity. The starting RU could be the same for each granularity so that on eNB side blind decoding effort can be relaxed, since the soft bit information calculated for the lower granularity can be reused for decoding for higher granularity. In accordance with an example embodiment, the granularity which is used for CB-PUSCH is decided by the TBS.

In accordance with an example embodiment, the UE can determine a reference starting RU according to a higher layer configuration and decide the starting RU for each HARQ process according to a configured offset (in terms of RUs) between HARQ processes. Having a different starting RU for each HARQ process enables the eNB to know the HARQ process ID implicitly after successful decoding the CB-PUSCH.

In another example embodiment, a network node or an eNB can configure a certain number of HARQ processes to CB UEs through broadcast signaling in order to balance the collision probability and the achieved throughput.

The operations in accordance with the example embodiments include:

eNB (e.g., NN 12 of FIG. 2) indicates to the UE (e.g., UE 10 of FIG. 2) an allocated resource pool, which contains a certain number of RUs;

eNB indicates to the UE an allocated UL resource set via an index of the resource set, and/or indicates a maximum granularity from which the UE determines other granularities;

eNB detects the transmission granularity used by UE by blind detection;

selected granularity is determined by transport block size (TBS);

Alternative: the eNB configures one UL resource set of granularities for initial UL transmission, and configures a another UL resource set of granularities for retransmissions;

UL resource set determination includes considering the amount of UL data (transport block size (TBS)) for required number of RUs, determining the starting RU based on HARQ process ID, on UE identifier e.g., C-RNTI, maximum granularity;

Network Node or eNB Operation:

The network node or eNB need to determine which set of granularities it should configure to each UE. This can be based on e.g., the number of CB UEs on the indicated resources. Typically if there are limited number of CB UEs with certain indicated resources, the configured granularities can be much higher.

The configurations from eNB to UE include:
1) eNB configure UE a certain amount of resources, i.e., a resource pool for CB transmission. The configuration could be through a dynamic signalling using a new DCI, or through high layer signalling;
2) eNB configure UE a transmission granularity set by indicating a set index, or by indicating the maximum transmission granularity so that UE can get other granularities implicitly;
3) As an option, the eNB configures RU offsets between the starting RU of each HARQ process; and/or
4) As another option, the eNB can configure number of HARQ processes for UEs through broadcast signalling.

UE Operation:

After UE got the configurations from eNB, the UE would decide the starting RU based on HARQ process ID and/or its identifier, for example C-RNTI. One function for the starting RU determination could be:

$$StartingRU_{CBPUSCH} = \mod(UE_{Id}, N_{CBPRBs}) + (HARQ_{processID} - 1) \times MAX_{granularity},$$

where:

$StartingRU_{CBPUSCH}$ is the starting RU for CB-PUSCH for a specific UE and for a specific HARQ process;

$N_{CBPRBs}$ is the whole number of RUs that are shared by CB UEs for CB-PUSCH transmission;

UE1d is the UE ID; and $HARQ_{processID}$ is the HARQ process ID, $HARQ_{processID} \geq 1$;

For the UE perspective, in accordance with an example embodiment of the invention the UE can determine the starting RU for CB-PUSCH transmission based on at least HARQ process ID and/or UE-ID.

In some situations, the resource units selected by two or more different UEs are fully or partially overlapped. For example, two UEs are using the same starting RU but with different transmission granularity. In such cases, it could be based on the network node or eNB implementation on how to detect signals from different UEs. As a typical example, the eNB can use a successive interference cancellation algorithm, by which eNB firstly detects the strongly signals, and remove it from the received signals in the overlapped resources, then detects the weaker signal.

In another example embodiment, the eNB can configure a certain number of HARQ processes to CB UEs through broadcast signaling in order to balance the collision probability and the achieved throughput.

Figure 3:
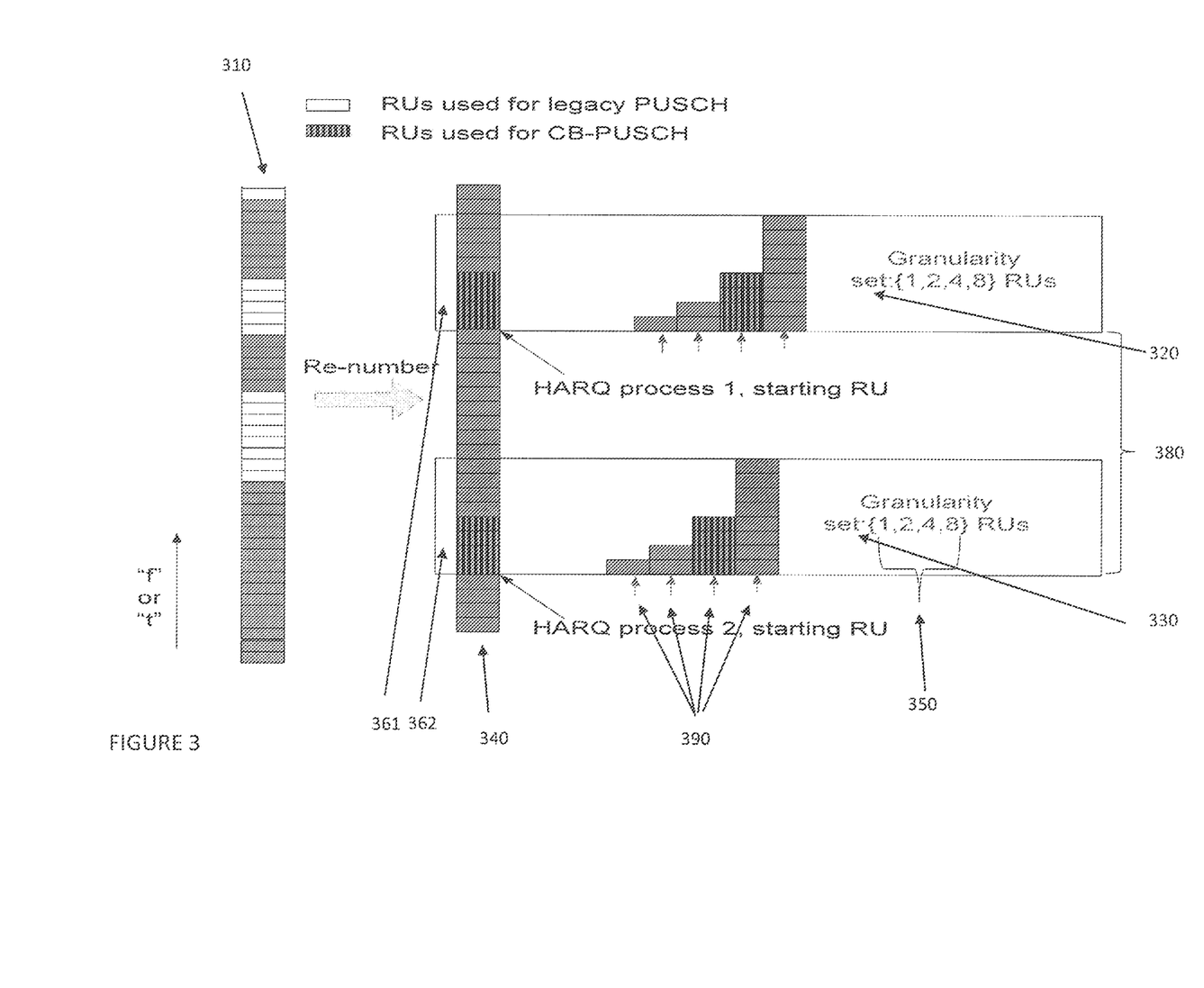
FIG. 3 shows a CB-PUSCH starting RU determined based on HARQ process ID.

One example is illustrated in FIG. 3, where the available RUs for CB-PUSCH are the ones not used for legacy PUSCH transmission. These RUs are re-numbered to generate sequential virtual RUs. In one embodiment, RU interleaving can be operated before the numbering. UE is configured with a granularity set {1, 2, 4, 8} RUs. The starting RUs for HARQ process 1 and HARQ process 2 are illustrated.

As shown in FIG. 3 there is shown granularity sets configured for HARQ processes in accordance with the example embodiments. As shown in FIG. 3, in frequency domain "f" 310 or in time domain "t" 310, there are a certain number of resource units allocated for legacy PUSCH and other resource units configured for CB-PUSCH, respectively. The resource units used for CB-PUSCH form a resource pool 340. In accordance with the example embodiments the resource units for CB-PUSCH are renumbered to generate sequential virtual RUs in accordance with the defined granularities such that at least some of the granularities can be used for CB-PUSCH for each UE. Then the granularities are sent to a UE, such as the UE 10 of FIG. 2. In accordance with the example embodiments the granularities are sent to UEs which are configured to use the same resource pool for their contention based signalling.

In accordance with the example embodiments, as shown in FIG. 3, the granularity set can include multiple resource units, based on network node or eNB configuration. As shown in FIG. 3, one UL packet from a specific UE is segmented to be two transport blocks, corresponding to two HARQ processes, HARQ process 1 and HARQ process 2, respectively. The starting RU for each HARQ process is determined by at least the HARQ process ID and/or UE ID. As a result, there is a starting RU offset 380 between HARQ process 1 and HARQ process 2. As an alternative, this offset can be preconfigured by the network node or eNB. The UE is configured with a granularity set 320 and 330 for each HARQ process, which contains {1,2,4,8} resource units, as shown in 350. The starting resource unit for each granularity is same, as in 390. Based on the determined starting RU and the configured granularity set, the available resource units for HARQ process 1 and HARQ process 2 are shown in 361 and 362, respectively. In FIG. 3 UE selects 4 resource units out of the available resource units 361, 362 to transmit CB-PUSCH for each HARQ process, based on the CB-PUSCH TBS. The rest of the available resource units might be used for transmitting CB-PUSCH for other UEs. In accordance with the example embodiments there is configuring a resource pool 340 for a plurality of user equipment configured with contention based transmission; configure a resource allocation 361, 362 within the resource pool 340 for a contention based transmission by a user equipment of the plurality of user equipment configured for contention based transmissions, wherein the resource allocation 361, 362 is configured with more than one predefined or preconfigured sets 330, 320 of resource allocation granularities 350; and send information 420 comprising the resource allocation 361, 362 towards the user equipment, wherein the information comprises an indication of a set 370 of the predefined or preconfigured sets 320, 330 of the resource allocation granularities 350 that the user equipment is to use for the contention based transmission 390.

Figure 4A:
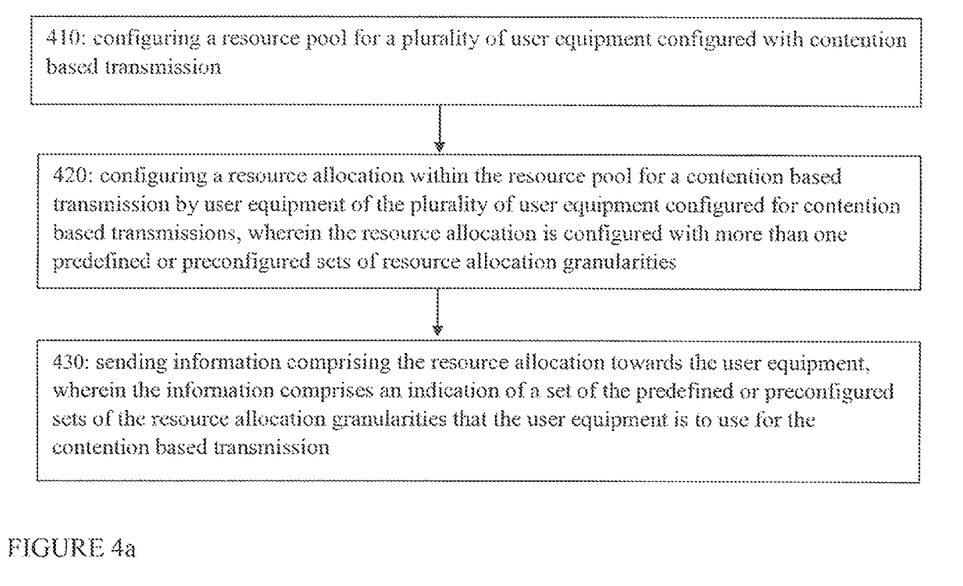
FIGS. 4a and 4b each show a method in accordance with example embodiments of the invention which may be performed by an apparatus.

FIG. 4a illustrates operations which may be performed by a network device such as, but not limited to, a network node NN 12 as in FIG. 2 or an eNB. As shown in step 410 there is configuring a resource pool for a plurality of user equipment configured with contention based transmission. Then as shown in step 420 there is configuring a resource allocation within the resource pool for a contention based transmission by a user equipment of the plurality of user equipment configured for contention based transmissions, wherein the resource allocation is configured with more than one predefined or preconfigured sets of resource allocation granularities. Then at step 430 there is sending information comprising the resource allocation towards the user equipment, wherein the information comprises an indication of a set of the predefined or preconfigured sets of the resource allocation granularities that the user equipment is to use for the contention based transmission.

In accordance with the example embodiments as described in the paragraphs above, the indication of the set of the predefined or preconfigured sets of the resource allocation that the user equipment is to use comprises at least one of a set index and a maximum granularity of the set the user equipment is to use for the contention based transmission.

In accordance with the example embodiments as described in the paragraphs above, the configured resource pool comprises at least one physical resource unit, and interleaving and re-numbering the physical resource units to generate sequential virtual physical resource units.

In accordance with the example embodiments as described in the paragraphs above, each of the predefined or preconfigured sets of resource allocation granularities comprises a different number of physical resource units.

In accordance with the example embodiments as described in the paragraphs above, each of the physical resource units contain at least one physical resource block.

In accordance with the example embodiments as described in the paragraphs above, the information comprises a hybrid automatic repeat request process configuration for at least one user equipment of the plurality of user equipment, and wherein a resource unit offset is configured between the hybrid automatic repeat processes.

In accordance with the example embodiments as described in the paragraphs above, the set of the predefined or preconfigured sets of the resource allocation granularities that the user equipment is to use for the contention based transmission are different for different hybrid automatic repeat processes.

In accordance with the example embodiments as described in the paragraphs above, a starting physical resource unit of at least one starting physical resource unit of the configured resource pool that the user equipment is to use for contention based transmission is based on at least one of a hybrid automatic repeat request process ID and a UE identifier such as a cell-radio network temporary identifier associated with the user equipment.

In accordance with the example embodiments as described in the paragraphs above, the starting physical resource unit is same for the indicated set of resource allocation granularities.

In accordance with the example embodiments as described in the paragraphs above, an amount of the more than one predefined or preconfigured sets of resource allocation granularities is based on an amount of the plurality of user equipment configured for contention based transmissions.

In accordance with the example embodiments as described in the paragraphs above, the configuration of the more than one predefined or preconfigured sets of resource allocation granularities may be provided to the user equipment via any kind of signaling indication e.g., the configuration is sent through broadcasting signaling, or through the user equipment specific higher layer signaling or through the group user equipment specific higher layer signaling, or through the user equipment specific physical layer signaling or through the group user equipment specific physical layer signaling. Group user specific signaling means that multiple UEs are grouped together and an eNB would send one signaling indication to all UEs in the same group. The benefit of physical layer signaling is "fast" propagation and "fast" feedback response, but has higher signaling overhead, while the benefit of higher layer signaling is lower signaling overhead, but is "slow" compared to physical layer signaling.

In accordance with the example embodiments as described in the paragraphs above, the indication of the set of the predefined or preconfigured sets of the resource allocation granularities is through broadcasting signaling, or UE specific or group UE specific higher layer signaling, or UE specific or group UE specific physical layer signaling.

A non-transitory computer-readable medium (MEM 12B of FIG. 2) storing program code (PROG 12C of FIG. 2), the program code executed by at least one processor (DP 12A and/or DP 12F of FIG. 2) to perform the operations as at least described in the paragraphs above.

In accordance with an example embodiment of the invention as described above there is an apparatus comprising: means for configuring (DP 12A, DP 12F, PROG 12C, and MEM 12B of FIG. 2) a resource pool for a plurality of user equipment configured with contention based transmission. There are means for configuring (DP 12A, DP 12F, PROG 12C, and/or MEM 12B of FIG. 2) by a device [NN 12 of FIG. 2 or eNB], a resource allocation within the resource pool for a contention based transmission by a user equipment [UE 10 of FIG. 2] of a plurality of user equipment configured for contention based transmissions, wherein the resource allocation is configured with more than one predefined or preconfigured sets of resource allocation granularities. Further, there is means for sending (Antenna 12E, transmitter/receiver 12D of FIG. 2) information comprising the resource allocation towards the user equipment [UE 10], wherein the information comprises an indication of a set of the predefined or preconfigured sets of the resource allocation granularities that the user equipment is to use for the contention based transmission.

In the example aspect of the invention according to the paragraph above, wherein at least the means for configuring and sending comprises a non-transitory computer readable medium [MEM 12B] encoded with a computer program [PROG 12C] executable by at least one processor [DP 12A and/or 12F].

Figure 4B:
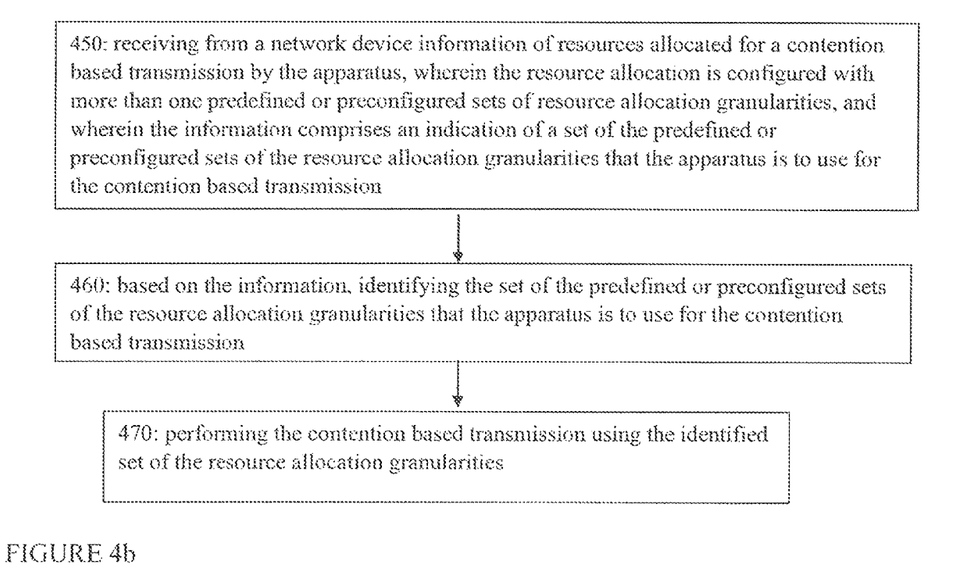

FIG. 4b illustrates operations which may be performed by a device such as, but not limited to, a device (e.g., the UE 10 as in FIG. 2). As shown in step 450 of FIG. 4b, there is receiving from a network device information of resources allocated for a contention based transmission by the apparatus, wherein the resource allocation is configured with more than one predefined or preconfigured sets of resource allocation granularities, and wherein the information comprises an indication of a set of the predefined or preconfigured sets of the resource allocation granularities that the apparatus is to use for the contention based transmission. As shown in step 460 of FIG. 4b there is, based on the information, identifying the set of the predefined or preconfigured sets of the resource allocation granularities that the apparatus is to use for the contention based transmission. Then as shown in step 470 the contention based transmission is performed using the identified set of the resource allocation granularities.

In accordance with the example embodiments as described in the paragraph above, the indication of the set of the predefined or preconfigured sets of the resource allocation granularities that the apparatus is to use comprises at least one of a set index and a maximum granularity of the set to use for the contention based transmission.

In accordance with the example embodiments as described in the paragraphs above, the configured resource pool comprises at least one physical resource unit, and interleaving and re-numbering the physical resource units to generate sequential virtual physical resource units.

In accordance with the example embodiments as described in the paragraphs above, each of the predefined or preconfigured sets of resource allocation granularities comprises a different number of physical resource units.

In accordance with an example embodiment, the UE can determine a reference starting RU according to a higher layer configuration and decide the starting RU for each HARQ process according to a configured offset (in terms of RUs) between HARQ processes.

In accordance with the example embodiments as described in the paragraphs above, a starting physical resource unit of at least one starting physical resource unit of the configured resource pool that the user equipment is to use for contention based transmission is based on at least one of a hybrid automatic repeat request process ID and a UE identifier such as a cell-radio network temporary identifier associated with the user equipment e.g., as described in UE operations above In accordance with the example embodiments as described in the paragraphs above, the starting physical resource unit is same for the indicated set of resource allocation granularities. This can relax eNB side blind decoding effort, since the soft bit information calculated for the lower granularity can be reused for decoding for higher granularity.

In accordance with the example embodiments as described in the paragraphs above, the configuration of the more than one sets of resource allocation granularities is received through broadcasting signaling, or the user equipment specific or group user equipment specific higher layer signaling, or the user equipment specific or group user equipment specific physical layer signaling.

In accordance with the example embodiments as described in the paragraphs above, the indication of the set of the predefined or preconfigured sets of the resource allocation granularities is through the broadcasting signaling, or the UE specific or group UE specific higher layer signaling, or the UE specific or group UE specific physical layer signaling.

A non-transitory computer-readable medium (MEM 12B of FIG. 2) storing program code (PROG 10C of FIG. 2), the program code executed by at least one processor (DP 10A and/or DP 10F of FIG. 2) to perform the operations as at least described in the paragraphs above.

In accordance with an example embodiment of the invention as described above there is an apparatus comprising: means for receiving (Antenna 10E, transmitter/receiver 10D of FIG. 2) from a network device [NN 12 of FIG. 2 or eNB], information of resources allocated for a contention based transmission by the apparatus [e.g., UE 10 of FIG. 2], wherein the resource allocation is configured with more than one predefined or preconfigured sets of resource allocation granularities, and wherein the information comprises an indication of a set of the predefined sets of the resource allocation granularities that the apparatus is to use for the contention based transmission. Further, there is means, based on the information, for identifying (DP 10A, DP 10F, PROG 10C, and/or MEM 10B of FIG. 2) the set of the predefined sets of the resource allocation granularities that the apparatus is to use for the contention based transmission. In addition, there is means for performing (Antenna 10E, transmitter/receiver 10D, DP 10A, DP 10F, PROG 10C, and MEM 10B of FIG. 2) the contention based transmission using the identified set of the resource allocation granularities.

In the example aspect of the invention according to the paragraph above, wherein at least the means for receiving, identifying, configuring, and performing comprises a non-transitory computer readable medium [MEM 10B] encoded with a computer program [PROG 10C] executable by at least one processor [DP 10A and/or 10F].

In accordance with the example embodiments the benefit of flexible resource allocation by selecting the most suitable transmission granularity from a set results in improved UL throughput. If the packet size is very small, UE will select a smallest transmission granularity; the rest of resources can be used by other UEs. Further, the benefits of the operations in accordance with the example embodiments include achieving randomized starting positions among UEs which may be determined based on UE ID, process ID, and/or the flexible resource granularity, and which can lead to a low collision probability.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of example and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. An apparatus comprising:
    at least one processor; and
    at least one non-transitory memory including computer program code, where the at least one memory and the computer program code are configured, with the at least one processor, to cause the apparatus to at least:
        configure a resource pool for a plurality of user equipment configured with contention based transmission;
        configure a resource allocation within the configured resource pool for a contention based transmission by user equipment of the plurality of user equipment configured for contention based transmissions, wherein the resource allocation is configured with more than one predefined or preconfigured sets of resource allocation granularities each comprising at least one physical resource unit of the configured resource pool; and
        send information comprising the resource allocation towards the user equipment, wherein the information comprises an indication of a set of the predefined or preconfigured sets of the resource allocation granularities and a maximum transmission granularity associated with the predetermined number of each of predefined or preconfigured sets of the resource allocation granularities for use by the user equipment to identify a particular set of the predefined or preconfigured sets of the resource allocation granularities to use for the contention based transmission.

2. The apparatus according to claim 1, wherein the indication of the set of the predefined or preconfigured sets of the resource allocation that the user equipment is to use comprises at least one of a set index and the maximum transmission granularity of the particular set the user equipment is to use for the contention based transmission.

3. The apparatus according to claim 1, wherein the at least one memory including the computer program code is configured with the at least one processor to cause the apparatus to interleave and re-number the at least one physical resource unit to generate sequential virtual physical resource units.

4. The apparatus according to claim 1, wherein each of the predefined or preconfigured sets of resource allocation granularities comprises a different number of at least one physical resource unit.

5. The apparatus according to claim 4, wherein each of the at least one physical resource unit contain at least one physical resource block.

6. The apparatus according to claim 1, wherein a starting physical resource unit of the at least one physical resource unit of the configured resource pool that the user equipment is to use for contention based transmission is based on at least one of a hybrid automatic repeat request process ID and a cell-radio network temporary identifier associated with the user equipment, and wherein the starting physical resource unit is same for the indicated set of resource allocation granularities.

7. The apparatus according to claim 6, wherein the maximum transmission granularity is based on at least one of a targeted collision probability or a targeted latency probability.

8. The apparatus according to claim 1, wherein the information comprises a hybrid automatic repeat request process configuration for at least one user equipment of the plurality of user equipment, and wherein a resource unit offset is configured between the hybrid automatic repeat processes.

9. The apparatus according to claim 8, wherein the set of the predefined or preconfigured sets of the resource allocation granularities that the user equipment is to use for the contention based transmission are different for different hybrid automatic repeat processes.

10. The apparatus according to claim 1, wherein the particular set of the predefined or preconfigured sets of resource allocation granularities is identified based on a comparison of the maximum transmission granularity of the particular set and an amount of the plurality of user equipment configured for contention based transmissions.

11. The apparatus according to claim 1, wherein the information comprising the resource allocation and the indication of the set of the predefined or preconfigured sets of resource allocation granularities and the maximum transmission granularity of each of predefined or preconfigured sets is sent through broadcasting signaling.

12. The apparatus according to claim 1, wherein the information comprising the resource allocation and the indication of the set of the predefined or preconfigured sets of the resource allocation granularities and a maximum transmission granularity of each of predefined or preconfigured sets is sent via one of user equipment specific or group user equipment specific higher layer signaling, or user equipment specific or group user equipment specific physical layer signaling.

13. An apparatus comprising:
at least one processor; and
at least one non-transitory memory including computer program code, where the at least one memory and the computer program code are configured, with the at least one processor, to cause the apparatus to at least:
receive from a network device information of resources allocated for a contention based transmission by the apparatus, wherein the resource allocation is configured with more than one predefined or preconfigured sets of resource allocation granularities each comprising at least one physical resource unit of a configured resource pool, and wherein the information comprises an indication of a set of the predefined or preconfigured sets of the resource allocation granularities and a maximum transmission granularity associated with the predetermined number of each of predefined or preconfigured sets of the resource allocation granularities for use by the apparatus to identify a particular set of the predefined or preconfigured sets of the resource allocation granularities to use for the contention based transmission;
based on the information, identify the set of the predefined or preconfigured sets of the resource allocation granularities that the apparatus is to use for the contention based transmission; and
perform the contention based transmission using the identified set of the resource allocation granularities.

14. The apparatus according to claim 13, wherein the indication of the set of the predefined or preconfigured sets of the resource allocation granularities that the apparatus is to use comprises at least one of a set index and the maximum transmission granularity of the particular set to use for the contention based transmission.

15. The apparatus according to claim 13, wherein the configured resource pool comprises at least one physical resource unit, and interleaving and re-numbering the at least one physical resource unit to generate sequential virtual physical resource units.

16. The apparatus according to claim 14, wherein each of the predefined or preconfigured sets of resource allocation granularities comprises a different number of the at least one physical resource unit.

17. The apparatus according to claim 13, wherein the apparatus can determine a reference starting resource unit according to a higher layer configuration and determine a starting resource unit for each hybrid automatic repeat request process according to a configured offset of resource units between hybrid automatic repeat request processes.

18. The apparatus according to claim 13, wherein a starting physical resource unit of at least one starting physical resource unit of the configured resource pool that the apparatus is to use for contention based transmission is based on at least one of a hybrid automatic repeat request process ID and a cell-radio network temporary identifier associated with the apparatus, and wherein the starting physical resource unit is same for the indicated set of resource allocation granularities.

19. The apparatus according to claim 18, wherein the maximum transmission granularity is based on at least one of a targeted collision probability or a targeted latency probability.

20. The apparatus according to claim 13, wherein the configuration of the more than one sets of resource allocation granularities is received through broadcasting signaling, or the apparatus specific or group apparatus specific higher layer signaling, or apparatus specific or group apparatus specific physical layer signaling.

21. A non-transitory program storage device readable by a machine, tangibly embodying a program of instructions executable by the machine for performing operations, the operations comprising:
configuring a resource pool for a plurality of user equipment configured with contention based transmission;
configuring a resource allocation within the resource pool for a contention based transmission by user equipment of the plurality of user equipment configured for contention based transmissions, wherein the resource allocation is configured with more than one predefined or preconfigured sets of resource allocation granularities each comprising at least one physical resource unit of the resource pool; and
sending information comprising the resource allocation towards the user equipment, wherein the information comprises an indication of a set of the predefined or preconfigured sets of the resource allocation granularities and a maximum transmission granularity associated with the predetermined number of each of predefined or preconfigured sets of the resource allocation granularities for use by the user equipment to identify a particular set of the predefined or preconfigured sets of the resource allocation granularities to use for the contention based transmission.

22. A non-transitory program storage device readable by a machine, tangibly embodying a program of instructions executable by the machine for performing operations, the operations comprising:
   receiving from a network device information of resources allocated for a contention based transmission by the machine, where the machine comprises a user equipment, wherein the resource allocation is configured with more than one predefined or preconfigured sets of resource allocation granularities each comprising at least one physical resource unit of a configured resource pool, and wherein the information comprises an indication of a set of the predefined or preconfigured sets of the resource allocation granularities and a maximum transmission granularity associated with the predetermined number of each of predefined or preconfigured sets of the resource allocation granularities for use by the user equipment to identify a particular set of the predefined or preconfigured sets of the resource allocation granularities for the contention based transmission;
   based on the information, identifying the set of the predefined or preconfigured sets of the resource allocation granularities that the user equipment is to use for the contention based transmission; and
   performing the contention based transmission using the identified set of the resource allocation granularities.

* * * * *